US 8,468,275 B2

(12) United States Patent
Salapura et al.

(10) Patent No.: US 8,468,275 B2
(45) Date of Patent: Jun. 18, 2013

(54) HARDWARE SUPPORT FOR SOFTWARE CONTROLLED FAST RECONFIGURATION OF PERFORMANCE COUNTERS

(75) Inventors: Valentina Salapura, Yorktown Heights, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 12/684,496

(22) Filed: Jan. 8, 2010

(65) Prior Publication Data

US 2011/0173431 A1 Jul. 14, 2011

(51) Int. Cl.
*G06F 3/00* (2006.01)
*G06F 1/24* (2006.01)

(52) U.S. Cl.
USPC ............................................. 710/10; 713/100

(58) Field of Classification Search
None
See application file for complete search history.

(56) References Cited

U.S. PATENT DOCUMENTS

| | | | | |
|---|---|---|---|---|
| 5,463,761 | A * | 10/1995 | Culley | 713/502 |
| 6,112,318 | A * | 8/2000 | Jouppi et al. | 714/47.1 |
| 6,931,354 | B2 | 8/2005 | Jones et al. | |
| 7,272,754 | B2 | 9/2007 | Love et al. | |
| 2006/0167658 | A1 | 7/2006 | Mericas | |
| 2008/0177756 | A1* | 7/2008 | Kosche et al. | 707/100 |

OTHER PUBLICATIONS

U.S. Official Action mailed Mar. 20, 2012 in related U.S. Appl. No. 12/684,429.
U.S. Notice of Allowance mailed May 22, 2012 in related U.S. Appl. No. 12/684,172.
U.S. Notice of Allowance mailed May 24, 2012 in related U.S. Appl. No. 12/684,367.
Moore, Research Disclosure Database No. 481010, High Performance Dynamically Updateable Software Architecture, May 2004.
Dalton, Chris et al., Afterburner: A Network-independent card provides architectural support for high-performance protocols, IEEE Jul. 1993.
Cameron, K.W., Instruction level characterization of scientific computing applications using hardware performance counters, IEEE Workload Characterization: Methodology and Case Studies, pp. 125-131, 1999.
U.S Office Action mailed in related U.S. Appl. No. 13/446,467 on Dec. 7, 2012.
Browne et al., A Portal Programming Interface for Performance Evaluation on Modern Processors, Aug. 2000, pp. 189-204.
U.S Office Action mailed in related U.S. Appl. No. 12/684,190 on Nov. 15, 2012.
U.S Office Action mailed in related U.S. Appl. No. 13/566,528 on Dec. 11, 2012.

* cited by examiner

*Primary Examiner* — Idriss N Alrobaye
*Assistant Examiner* — Richard B Franklin
(74) *Attorney, Agent, or Firm* — Scully, Scott, Murphy & Presser, P.C.; Daniel P. Morris, Esq.

(57) ABSTRACT

Hardware support for software controlled reconfiguration of performance counters may include a plurality of performance counters collecting one or more counts of one or more selected activities. A storage element stores data value representing a time interval, and a timer element reads the data value and detects expiration of the time interval based on the data value and generates a signal. A plurality of configuration registers stores a set of performance counter configurations. A state machine receives the signal and selects a configuration register from the plurality of configuration registers for reconfiguring the one or more performance counters.

19 Claims, 3 Drawing Sheets

HARDWARE SUPPORT FOR SOFTWARE CONTROLLED FAST RECONFIGURATION OF PERFORMANCE COUNTERS

STATEMENT REGARDING FEDERALLY SPONSORED RESEARCH OR DEVELOPMENT

This invention was made with Government support under Contract No. B554331 awarded by the Department of Energy. The Government has certain rights in this invention.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 12/684,367, for "USING DMA FOR COPYING PERFORMANCE COUNTER DATA TO MEMORY"; U.S. patent application Ser. No. 12/684,172 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. patent application Ser. No. 12/684,429, for "HARDWARE SUPPORT FOR SOFTWARE CONTROLLED FAST MULTIPLEXING OF PERFORMANCE COUNTERS"; U.S. patent application Ser. No. 12/697,799, for "CONDITIONAL LOAD AND STORE IN A SHARED CACHE"; U.S. patent application Ser. No. 12/684,738, for "DISTRIBUTED PERFORMANCE COUNTERS"; U.S. patent application Ser. No. 61/261,269, for "LOCAL ROLLBACK FOR FAULT-TOLERANCE IN PARALLEL COMPUTING SYSTEMS"; U.S. patent application Ser. No. 12/684,860, for "PROCESSOR WAKE ON PIN"; U.S. patent application Ser. No. 12/684,174, for "PRECAST THERMAL INTERFACE ADHESIVE FOR EASY AND REPEATED, SEPARATION AND REMATING"; U.S. patent application Ser. No. 12/684,184, for "ZONE ROUTING IN A TORUS NETWORK"; U.S. patent application Ser. No. 12/684,852, for "PROCESSOR WAKEUP UNIT"; U.S. patent application Ser. No. 12/684,642, for "TLB EXCLUSION RANGE"; U.S. patent application Ser. No. 12/684,804, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 61/293,237, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, for "SUPPORT FOR NON-LOCKING PARALLEL RECEPTION OF PACKETS BELONGING TO THE SAME MESSAGE"; U.S. patent application Ser. No. 12/688,773, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE DIRECTORY LOOK-UP REUSE"; U.S. patent application Ser. No. 13/008,502, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308 for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 61/293,552, for "LIST BASED PREFETCH"; U.S. patent application Ser. No. 12/684,693, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. patent application Ser. No. 61/293,476, for "NETWORK SUPPORT FOR SYSTEM INITIATED CHECKPOINTS"; U.S. patent application Ser. No. 12/696,746, for "TWO DIFFERENT PREFETCH COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,287 for ARBITRATION IN CROSSBAR FOR LOW LATENCY; U.S. patent application Ser. No. 12/684,630 for EAGER PROTOCOL ON A CACHE PIPELINE DATAFLOW; U.S. patent application Ser. No. 12/723,277 for EMBEDDED GLOBAL BARRIER AND COLLECTIVE IN A TORUS NETWORK; U.S. patent application Ser. No. 12/696,764 for GLOBAL SYNCHRONIZATION OF PARALLEL PROCESSORS USING CLOCK PULSE WIDTH MODULATION; U.S. patent application Ser. No. 12/796,411 for IMPLEMENTATION OF MSYNC; U.S. patent application Ser. No. 12/796,389 for NON-STANDARD FLAVORS OF MSYNC; U.S. patent application Ser. No. 12/696,817 for HEAP/STACK GUARD PAGES USING A WAKEUP UNIT; U.S. patent application Ser. No. 61/293,603 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475 for REPRODUCIBILITY IN BGQ.

FIELD OF THE INVENTION

The present disclosure relates generally to performance counters, and more particularly to hardware support for software controlled reconfiguration of performance counters.

BACKGROUND

Understanding the performance of programs running on today's chips is complicated. Programs themselves are becoming increasingly complex and intertwined with a growing number of layers in the software stack. Hardware chips are also becoming more complex. The current generation of chips is multicore and the next generation will be likely to have even more cores and will include networking, switches, and other components integrated on to the chip.

Performance counters can help programmers address the challenges created by the above complexity by providing insight into what is happening throughout the chip, in the functional units, in the caches, and in the other components on the chip. Performance counter data also helps programmers understand application behavior. Chips have incorporated performance counter events for several generations, and software ecosystems have been designed to help analyze the data provided by such counters. Among the significant limitations of performance counters are the number of counters that may be gathered simultaneously and the rate at which the data may be gathered.

Hardware performance counters provide insight into the behavior of the various aspects of a chip. Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. Depending on the chip there are 100s to a 1000 or so counter events that provide information about the chip. However, most chip architectures only allow a small subset of these counter events to be counted simultaneously due to a small number of performance counters implemented There are several engineering reasons why it is difficult to gather a large number of counters. One is that some of the useful data originates in areas of the chip where area is a very scarce resource. Another reason is that trying to provide paths and multiplexers to export many counters takes power and area that is not available. Counters themselves are implemented as latches, and a large number of large counters require large area and power. What is needed is an efficient mechanism to best utilize the limited performance counters that are available.

One way to better utilize the limited number of hardware counters is to multiplex between groups of them. That is, software can create a number of different sets of hardware counter groups and then can switch between the groups over time. If software can do this relatively quickly, for example, every 100 microseconds, then it can appear to higher-level software as if there are actually more counters than what the hardware actually provides. There is a tradeoff though. The more frequently the groups are switched between, the more accurate the results. However, the more frequently the groups are switched between them, the more overhead is incurred. Performing multiplexing in software is expensive in terms of time. There are many instructions that need to be executed, and frequently, a context switch needs to occur.

BRIEF SUMMARY

A device and method for providing hardware support for reconfiguring performance counters in a computer system are provided. The device, in one aspect, may include a plurality of performance counters operable to collect one or more counts of one or more selected activities. A storage element stores data value representing a time interval, and a timer element reads the data value and detects expiration of the time interval based on the data value. A plurality of configuration registers may be operable to store a set of performance counter configurations. A state machine may be operable to receive a notification of the expiration of the time interval and further may be operable to select a configuration register from the plurality of configuration registers for reconfiguring the one or more performance counters.

A hardware support method for software controlled reconfiguration of performance counters, in one aspect, may include a timer processing element obtaining a time interval value. The method may further include, in response to detecting expiration of the time interval value, a state machine switching to a different configuration register among a plurality of configuration registers specifying which hardware related activities to count.

In another aspect, a device for providing hardware support for reconfiguring performance counters in a computer system may include a plurality of performance counters operable to collect one or more counts of one or more selected activities. A plurality of configuration registers may be operable to store a set of performance counter configurations. A state machine may be operable to receive a signal, and in response to the received signal select a configuration register from the plurality of configuration registers for reconfiguring the one or more performance counters.

Further features as well as the structure and operation of various embodiments are described in detail below with reference to the accompanying drawings. In the drawings, like reference numbers indicate identical or functionally similar elements.

DETAILED DESCRIPTION

The present disclosure, in one aspect, describes hardware support to facilitate the efficient hardware switching and storing of counters. Particularly, in one aspect, the hardware support of the present disclosure allows specification of a set of groups of hardware performance counters, and the ability to switch between those groups without software intervention.

In one embodiment, hardware and software is combined that allows for the ability to set up a series of different configurations of hardware performance counter groups. The hardware may automatically switch between the different configurations at a predefined interval. For the hardware to automatically switch between the different configurations, the software may set an interval timer that counts down, which upon reaching zero, switches to the next configuration in the stored set of configurations. For example, the software may set up the set of configurations that it wants the hardware to switch between and also set a count of the number of hardware configurations it has set up. When the interval timer reaches zero, the hardware may update the currently collected set of hardware counters automatically without involving the software and set up a new group of hardware performance counters to start being collected.

In another aspect, another configuration switching trigger may be utilized instead of a timer element. For example, an interrupt or an external interrupt from another device may be set up to periodically or at a predetermined time or event, to trigger the hardware performance counter reconfiguration or switching.

In one embodiment, a register or memory location specifies the number of times to perform the configuration switch. In another embodiment, rather than a count, an on/off binary value may indicate whether hardware should continue switching configurations or not.

Yet in another embodiment, the user may set a register or memory location to indicate that when the hardware switches groups, it should clear performance counters. In still yet another embodiment, a mask register or memory location may be used to indicate which counters should be cleared.

Figure 1:
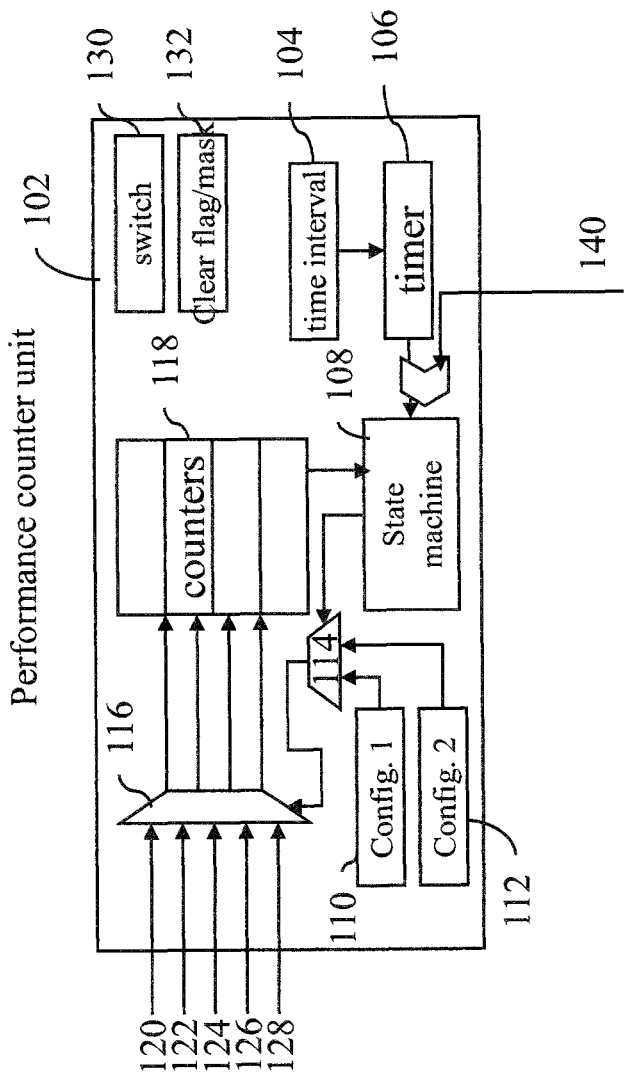
FIG. 1 shows a hardware device that supports performance counter reconfiguration in one embodiment of the present disclosure.

FIG. 1 shows a hardware device 102 that supports performance counter reconfiguration in one embodiment of the present disclosure. The device 102 may be built into a microprocessor and includes a plurality of hardware performance counters 118, which are registers or the like used to store the counts of hardware-related activities within a computer. Examples of activities of which the counters 118 may store counts may include, but are not limited to, cache misses, translation lookaside buffer (TLB) misses, the number of instructions completed, number of floating point instructions executed, processor cycles, input/output (I/O) requests, and other hardware-related activities and events.

A plurality of configuration registers 110, 112 may each include a set of configurations that specify what activities and/or events the counters 118 should count. For example, configuration 1 register 110 may specify counter events related to the network activity, like the number of packets sent or received in each of networks links, the errors when sending or receiving the packets to the network ports, or the errors in the network protocol. Similarly, configuration 2 register 112 may specify a different set of configurations, for example, counter events related to the memory activity, for instance, the number of cache misses for any or all cache level L1, L2, L3, or the like, or the number of memory requests issued to each of the memory banks for on-chip memory, or the number of cache invalidates, or any memory coherency related events. Yet another counter configuration can include counter events related to one particular processor's activity in a chip multi-processor systems, for example, instructions issued or instructions completed, integer and floating-point instructions, for the processor 0, or for any other processor. Yet another counter configuration may include the same type of counter events but belonging to different processors, for example, the number of integer instructions issued in all N processors. Any other counter configurations are possible. In one aspect, software may set up those configuration registers to include desired set of configurations by writing to those registers.

Initially, the state machine may be set to select a configuration (e.g., 110 or 112), for example, using a multiplexer or the like at 114. A multiplexer or the like at 116 then selects from the activities and/or events 120, 122, 134, 126, 128, etc., the activities and/or events specified in the selected configuration (e.g., 110 or 112) received from the multiplexer 114. Those selected activities and/or events are then sent to the counters 118. The counters 118 accumulate the counts for the selected activities and/or events.

A time interval component 104 may be a register or the like that stores a data value. In another aspect, the time interval component 104 may be a memory location or the like. Software such as an operating system or another program may set the data value in the time interval 104. A timer 106 may be another register that counts down from the value specified in the time interval register 104. In response to the count down value reaching zero, the timer 106 notifies a control state machine 108. For instance, when the timer reaches zero, this condition is recognized, and a control signal connected to the state machine 108 becomes active. Then the timer 106 may be reset to the time interval value to start a new period for collecting data associated with the next configuration of hardware performance counters.

In response to receiving a notification from the timer 106, the control state machine 108 selects the next configuration register, e.g., configuration 1 register 110 or configuration 2 register 112 to reconfigure activities tracked by the performance counters 118. The selection may be done using a multiplexer 114, for example, that selects between the configuration registers 110 and 112. It should be noted that while two configuration registers are shown in this example, any number of configuration registers may be implemented in the present disclosure. Activities and/or events (e.g., as shown at 120, 122, 124, 126, 128, etc.) are selected by the multiplexer 116 based on the configuration selected at the multiplexer 114. Each counter at 118 accumulates counts for the selected activities and/or events.

In another embodiment, there may be a register or memory location labeled "switch" 130 for indicating the number of times to perform the configuration switch. In yet another embodiment, the indication to switch may be provided by an on/off binary value. In the embodiment with a number of possible switching between the configurations, the initial value may be specified by software. Each time the state machine 108 initiates state switching, the value of the remaining switching is decremented. Once the number of the allowed configuration switching reaches zero, all further configuration change conditions are ignored. Further switching between the configurations may be re-established after intervention by software, for instance, if the software re-initializes the switch value.

In addition, a register or memory location "clear" 132 may be provided to indicate whether to clear the counters when the configuration switch occurs. In one embodiment, this register has only one bit, to indicate if all counter values have to be cleared when the configuration is switched. In another embodiment, this counter has a number of bits M+1, where M is the number of performance counters 118. These register or memory values may be a mask register or memory location for indicating which of M counters should be cleared. In this embodiment, when configuration switching condition is identified, the state machine 108 clears the counters and selects different counter events by setting appropriate control signals for the multiplexer 116. If the clear mask is used, only the selected counters will be cleared. This may be implemented, for example, by AND-ing the clear mask register bits 132 and "clear registers" signal generated by the state machine 108 and feeding them to the performance counters 118.

In addition, or instead of using the time interval register 104 and timer 106, an external signal 140 generated outside of the performance monitoring unit may be used to start reconfiguration. For example, this signal may be an interrupt signal generated by a processor, or by some other component in the system. In response to receiving this external signal, the state machine 108 may start reconfiguration in the same way as described above.

Figures 2, 3:
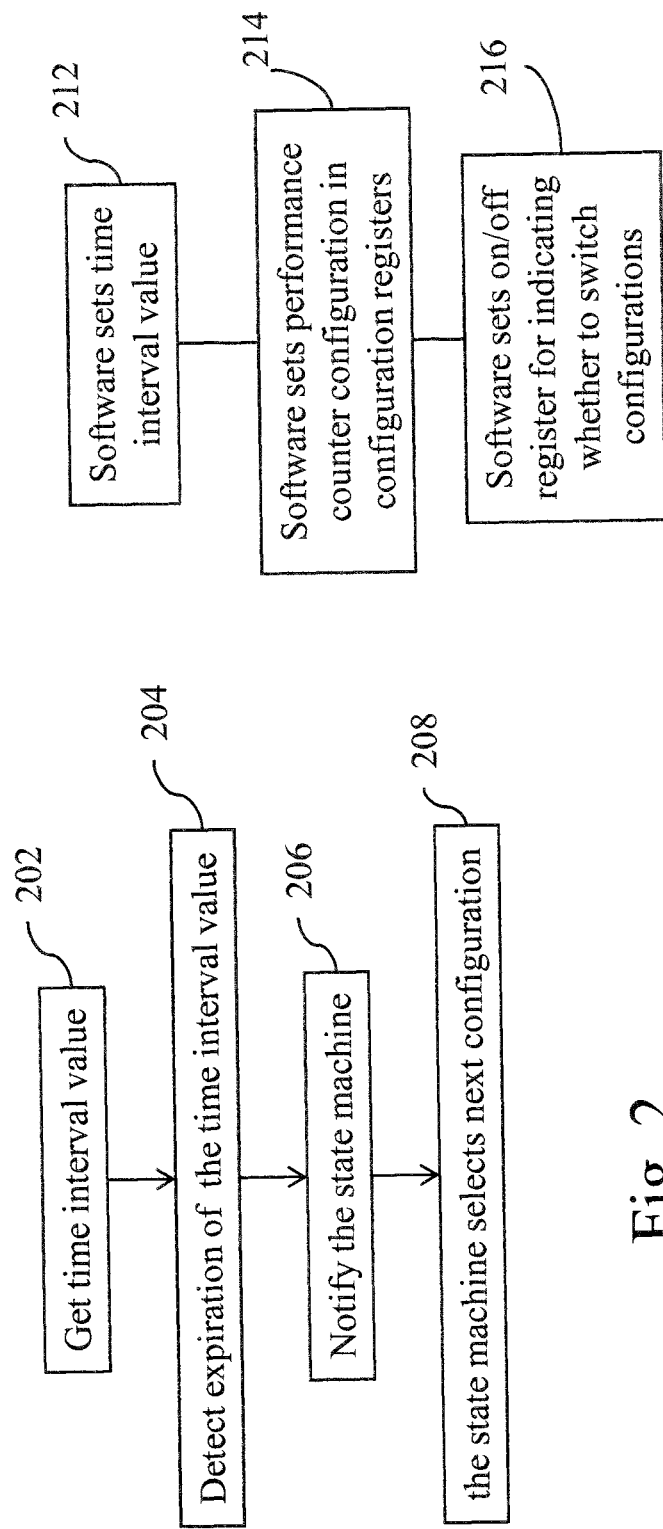
FIG. 2 is a flow diagram illustrating a hardware support method that supports software controlled reconfiguration of performance counters in one embodiment of the present disclosure.
FIG. 3 is a flow diagram illustrating the software programming the registers.

FIG. 2 is a flow diagram illustrating a hardware support method that supports software controlled reconfiguration of performance counters in one embodiment of the present disclosure. At 202, a timer element reads a value from a time interval register or the like. The software, for example, may have set or written the value into the time interval register. Examples of the software may include, but are not limited to, an operating system, another system program, or an application program, or the like. The value indicates the time interval for switching performance counter configuration. The value may be in units of clock cycles, milliseconds, seconds, or others. At 204, the timer element detects the expiration of the time specified by the value. For instance, the timer element may have counted down from the value and when the value reaches zero, the timer elements detects that the value has expired. Any other methods may be utilized by the timer element to detect the expiration of the time interval, e.g., the timer element may count up from zero until it reaches the value.

At 206, in response to detecting that the time interval set in the time interval register has passed, the timer element signals or otherwise notifies the state machine controlling the configuration register selection. At 208, the state machine selects the next configuration, for example, stored in a register. For example, the performance counters may have been providing counts for activities specified in configuration register A. After the state machine 108 selects the next configuration, for example, configuration register B, the performance counters start counting the activities specified in configuration register B, thus reconfiguring the performance counters. Once the state machine switches configuration, the timer elements again starts counting the time. For example, the timer element may again read the value from the timer interval register and for instance, start counting down from that number until it reaches zero. In the present disclosure, any number of configurations, for example, each stored in a register can be supported.

As described above, the desired time intervals for multiplexing (i.e., reconfiguring) are programmable. Further, the counter configurations are also programmable. For example, the software may set the desired configurations in the configuration registers. FIG. 3 is a flow diagram illustrating the software programming the registers. At 212, the software may set the time interval value in a register, for example, from which register the time may read the value to start counting down. At 214, the software may set the configurations for performance counters, for instance, in different configuration registers. At 216, the software may set a register value that indicates whether the state machine should be switching configurations. The value may be an on/off bit value, which the timer element reads to determine whether to signal the state machine. In another aspect, this value may be a number which indicates how many times the switching of the reconfiguration should occur. In addition, the software may set or program other parameters such as whether to clear the performance counters when switching or a select counter to clear. The steps shown in FIG. 3 may be performed at any time and in any order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
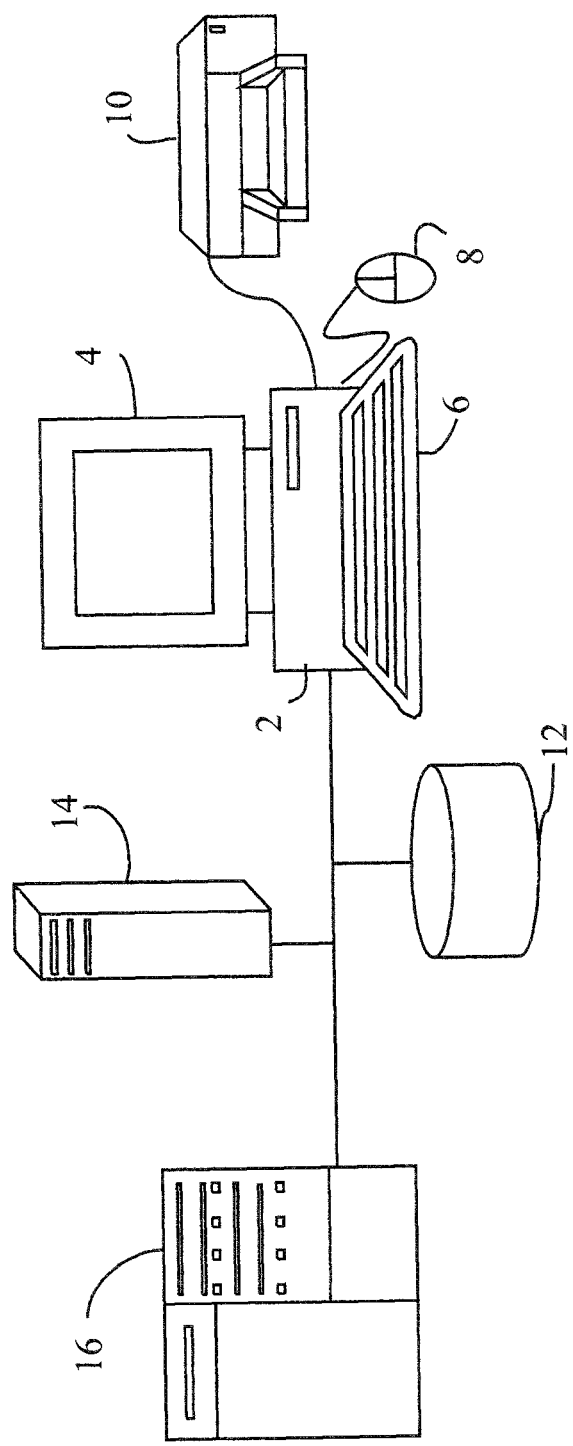
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A device for providing hardware support for reconfiguring performance counters in a computer system, comprising:
   a plurality of performance counters operable to collect one or more counts of one or more selected activities;
   a storage element operable to store data value representing time interval;
   a timer element operable to read the data value and detect expiration of the time interval based on the data value, the timer element further operable to generate a signal;
   a plurality of configuration registers operable to store a set of performance counter configurations;
   a state machine operable to receive the signal and select a configuration register from the plurality of configuration registers for reconfiguring the one or more performance counters; and
   a first multiplexer connected to the state machine and the plurality of registers, wherein the state machine selects the configuration register using the first multiplexer.

2. The device of claim 1, further including a second multiplexer connected to the first multiplexer, the second multiplexer selecting a set of activities to pass to the one or more performance counters based on configuration setting of the selected configuration register in the first multiplexer.

3. The device of claim 1, wherein the storage element is a register.

4. The device of claim 1, wherein the storage element is a memory location.

5. The device of claim 1, further including a second storage element storing a value indicating the number of times to perform reconfiguring of the one or more performance counters.

6. The device of claim 5, wherein the value is programmable by software.

7. The device of claim 1, further including a third storage element storing a value indicating whether to clear one or more of the plurality of performance counters.

8. The device of claim 7, wherein the value includes an on or off bit.

9. The device of claim 7, wherein the value includes a bit mask.

10. The device of claim 1, wherein the plurality of configuration registers is programmable by software.

11. The device of claim 1, wherein the time interval is programmable by software.

12. A device for providing hardware support for reconfiguring performance counters in a computer system, comprising:
   a plurality of performance counters operable to collect one or more counts of one or more selected activities;
   a storage element operable to store data value representing time interval;
   a timer element operable to read the data value and detect expiration of the time interval based on the data value, the timer element further operable to generate a signal;
   a plurality of configuration registers operable to store a set of performance counter configurations;
   a state machine operable to receive the signal and select a configuration register from the plurality of configuration registers for reconfiguring the one or more performance counters; and
   a second storage element storing an on or off bit indicating whether to perform reconfiguring.

13. The device of claim 12, wherein the on or off bit is programmable by software.

14. A hardware support method for software controlled reconfiguration of performance counters, comprising:
   collecting by a performance counter a count of a selected activity;
   selecting a configuration register using a first multiplexer among a plurality of configuration registers specifying which hardware related activities to count;
   a timer processing element obtaining a time interval value; and
   in response to detecting expiration of the time interval value, a state machine switching to the selected configuration register to reconfigure the selected activity tracked by the performance counter.

15. The method of claim 14, wherein the time interval value is programmed by software.

16. The method of claim 14, wherein the plurality of configuration registers is programmed by software.

17. A non-transitory computer readable storage medium storing a program of instructions executable by a machine to perform a hardware support method for software controlled reconfiguration of performance counters, comprising:
   collecting by a performance counter a count of a selected activity;
   selecting a configuration register among a plurality of configuration registers specifying which hardware related activities to count;
   identifying an on or off bit indicating whether to perform reconfiguring of the performance counter;
   a timer processing element obtaining a time interval value; and
   in response to detecting expiration of the time interval value and based on the on or off bit, a state machine switching to the selected configuration register to reconfigure the selected activity tracked by the performance counter.

18. The computer readable storage medium of claim 17, further including setting the time interval value.

19. The computer readable storage medium of claim 17, further including writing to the plurality of configuration registers for setting a plurality of configurations specifying selected performance counters for collecting counts of selected activities.

* * * * *